(12) United States Patent
Potrebic et al.

(10) Patent No.: US 7,571,454 B2
(45) Date of Patent: Aug. 4, 2009

(54) STRATEGIES FOR UPDATING SCHEDULES

(75) Inventors: Peter J. Potrebic, Calistoga, CA (US);
Thomas H. Taylor, Redmond, WA (US);
Naga Anjaneya Kumar Pasumarthy,
Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 11/122,173

(22) Filed: May 4, 2005

(65) Prior Publication Data

US 2006/0253867 A1    Nov. 9, 2006

(51) Int. Cl.
H04N 5/445 (2006.01)
G06F 3/00 (2006.01)
G06F 13/00 (2006.01)

(52) U.S. Cl. ........................................ 725/50; 386/83
(58) Field of Classification Search .................... 725/50
See application file for complete search history.

(56) References Cited

U.S. PATENT DOCUMENTS

| | | | |
|---|---|---|---|
| 5,666,645 A * | 9/1997 | Thomas et al. ................ 725/47 |
| 5,841,433 A * | 11/1998 | Chaney ........................ 725/50 |
| 6,177,931 B1 * | 1/2001 | Alexander et al. ............ 725/52 |
| 6,665,869 B1 * | 12/2003 | Ellis et al. ..................... 725/39 |
| 6,798,971 B2 | 9/2004 | Potrebic |
| 6,804,824 B1 | 10/2004 | Potrebic et al. |
| 6,897,904 B2 | 5/2005 | Potrebic et al. |
| 7,212,730 B2 | 5/2007 | Boston et al. |
| 2001/0052130 A1 | 12/2001 | Yap et al. |
| 2002/0108126 A1 | 8/2002 | Horowitz et al. |
| 2002/0110352 A1 | 8/2002 | Potrebic |
| 2002/0110353 A1 | 8/2002 | Potrebic et al. |
| 2002/0110360 A1 | 8/2002 | Potrebic |
| 2002/0136538 A1 | 9/2002 | Chen |
| 2002/0188944 A1 | 12/2002 | Noble |
| 2003/0128302 A1 | 7/2003 | Potrebic et al. |
| 2003/0198461 A1 | 10/2003 | Taylor et al. |
| 2003/0198462 A1 | 10/2003 | Bumgardner et al. |
| 2003/0204848 A1 | 10/2003 | Cheng et al. |

(Continued)

FOREIGN PATENT DOCUMENTS

JP          2004023326          1/2004

(Continued)

OTHER PUBLICATIONS

"Flex Watch Network Storage Server (NSS-1016)," available at <<http://www.remote-security.com/fwstorage.htm>>, accessed on Dec . 1, 2005, 3 pages.

(Continued)

Primary Examiner—Andrew Y Koenig
Assistant Examiner—Mark D Featherstone
(74) Attorney, Agent, or Firm—Lee & Hayes, PLLC

(57) ABSTRACT

Scheduling functionality is employed at a head-end site to update schedules used by a plurality of respective client devices to define the recording of media presentation events. The scheduling functionality operates by: compiling a master list of unique entries culled from the plurality of schedules; determining whether any entries in the master list require updating; and updating, based on the determining, at least one of the plurality of schedules. The scheduling functionality helps reduce the amount of redundant processing operations involved in updating the plurality of schedules, and therefore provides an efficient technique for updating the schedules.

20 Claims, 12 Drawing Sheets

U.S. PATENT DOCUMENTS

| | | |
|---|---|---|
| 2003/0212708 A1 | 11/2003 | Potrebic et al. |
| 2004/0078817 A1 | 4/2004 | Horowitz et al. |
| 2004/0218905 A1 | 11/2004 | Green et al. |
| 2004/0244030 A1 | 12/2004 | Boyce et al. |
| 2005/0025469 A1 | 2/2005 | Geer et al. |
| 2005/0073613 A1 | 4/2005 | Potrebic et al. |
| 2005/0237435 A1 | 10/2005 | Potrebic et al. |
| 2005/0246738 A1* | 11/2005 | Lockett et al. ................. 725/43 |
| 2006/0061682 A1 | 3/2006 | Bradley et al. |
| 2006/0062156 A1 | 3/2006 | Stultz et al. |
| 2006/0104611 A1 | 5/2006 | Gildred et al. |
| 2006/0206912 A1 | 9/2006 | Klarfeld et al. |
| 2006/0263040 A1 | 11/2006 | Mears et al. |

FOREIGN PATENT DOCUMENTS

| | | |
|---|---|---|
| WO | WO 03067594 | 8/2003 |
| WO | WO 2004053842 | 6/2004 |

OTHER PUBLICATIONS

Ochiva, "Potent Storage," available at <<http://www.findarticles.com/p/articles/mi_m0HFE/is_g_30/ai_n6072716/print>>, accessed on Dec. 1, 2005, 4 pages.

"Denon to launch 'Multi-Media Server'," available at <<http://www.pvruk.com/2004/06/denon_to_launch.html>>. accessed on Dec. 1, 2005, pp. 2,3 of 4.

"Boundless Security System," available at <<http: www.boundlesss.com/contact.html>>, accessed on Dec. 1, 2005, 1 page.

* cited by examiner

| Client | Program ID | EP | Start time | End time | Ch | State |
|---|---|---|---|---|---|---|
| 1 | Outback! | 213 | 9:00p 12/8/04 | 10:00p 12/8/04 | NBC | Conflicted |
| 1 | Outback! | 213 | 6:00p 12/10/04 | 7:00p 12/10/04 | NBC | Conflicted |
| 1 | Car Talk | 107 | 9:00p 12/8/04 | 10:00p 12/8/04 | ABC | Defined |
| 1 | Baseball | — | 6:00p 12/10/04 | 9:30p 12/10/04 | FOX | Defined |
| 2 | Outback! | 213 | 9:00p 12/8/04 | 10:00p 12/8/04 | NBC | Redundant |
| 2 | Outback! | 213 | 6:00p 12/10/04 | 7:00p 12/10/04 | NBC | Defined |
| 2 | NYC-MDs | 609 | 10:00p 12/9/04 | 11:00p 12/9/04 | NBC | Defined |
| 3 | NYC-MDs | 609 | 10:00p 12/9/04 | 11:00p 12/9/04 | NBC | Defined |
| 3 | Car Talk | 107 | 9:00p 12/8/04 | 10:00p 12/8/04 | ABC | Defined |

Fig. 7

| Outback! | 213 | | |
|---|---|---|---|
| NYC-MDs | 609 | | |
| Baseball | 6:00p 12/10/04 | 9:30p 12/10/04 | FOX |
| Car Talk | 107 | | |

Fig. 8

| 2 | ~~NYC-MDs~~ | ~~609~~ | ~~10:00p 12/9/04~~ | ~~11:00p 12/9/04~~ | ~~NBC~~ | *Preempted* |
| 3 | ~~NYC-MDs~~ | ~~609~~ | ~~10:00p 12/9/04~~ | ~~11:00p 12/9/04~~ | ~~NBC~~ | *Preempted* |

Fig. 10

| 1 | Outback! | 213 | 9:00p 12/8/04 | 10:00p 12/8/04 | NBC | Defined |
| 1 | Outback! | 213 | 6:00p 12/10/04 | 7:00p 12/10/04 | NBC | Redundant |
| 1 | Car Talk | 107 | 10:00p 12/8/04 | 11:00p 12/8/04 | BRV | Defined |
| 1 | Baseball | --- | 6:00p 12/10/04 | 9:00p 12/10/04 | FOX | Defined |
| 3 | Car Talk | 107 | 9:00p 12/9/04 | 10:00p 12/9/04 | ABC | Defined |

Fig. 11

| Client ID | Series ID | Time | Ch |
|---|---|---|---|
| 1 | Space Adv | Around 9pm | NBC |
| 1 | Court Drama | Around 9pm | ABC |
| 2 | Space Adv | Anytime | <Any> |
| 2 | Mystery | Around 10pm | NBC |
| 3 | Mystery | Anytime | TBS |
| 3 | Court Drama | Around 9pm | ABC |

| Series ID |
|---|
| Space Adv |
| Court Drama |
| Mystery |

US 7,571,454 B2

STRATEGIES FOR UPDATING SCHEDULES

TECHNICAL FIELD

This subject matter relates to strategies for processing schedules. In a more particular implementation, this subject matter relates to strategies for updating schedules pertaining to media presentation events.

BACKGROUND

Client-side digital video recorders (DVRs) include respective schedulers which govern the recording of media information based on respective locally-maintained schedules. With respect to an exemplary one of these DVRs, a user creates a schedule that includes one or more entries that identify media events. The entries can identify the media events based on information provided in an electronic program guide (EPG). In creating the schedule, the user can create one or more entries which identify respective singular media events to be recorded. The user can also create one or more entries which identify series-type media events to be recorded (where each series-type event potentially encompasses a series of episode events). The DVR's scheduler uses the created schedule to determine the timing at which identified media information is to be recorded.

Conventionally, the DVR may receive updated program guide information on a periodic basis, such as once a day. Newly received (i.e., current) program guide information may warrant that changes be made to a previously created schedule. For instance, the current program guide information may indicate that previously scheduled media events have been preempted (e.g., canceled), rescheduled, and so forth. Further, the current program guide information may include new episode events that need to be added to the schedule.

More precisely, in response to the receipt of new program guide information, a conventional scheduler analyzes the new program guide information to determine what changes need to be made to its schedule by performing an entry-by-entry examination of its schedule. The scheduler then makes appropriate changes to the schedule based on its analysis. Each client-side scheduler performs the above-described procedure independently of other schedulers. Thus, when new program guide information arrives, all schedulers can be expected to perform the above-described updating operations in parallel fashion.

As appreciated by the present inventors, there is an exemplary need in the art for more efficient strategies for updating schedules.

SUMMARY

According to one exemplary implementation, a method is described for updating schedules. The method comprises: (a) maintaining schedule information for a plurality of schedules; (b) compiling a master list of unique entries culled from the plurality of schedules; (c) determining whether any entries in the master list require updating; and (d) updating, based on the determining, at least one of the plurality of schedules.

Additional exemplary implementations are described in the following.

BRIEF DESCRIPTION OF THE DRAWINGS

FIGS. 6-11 illustrate the application of the procedure of FIG. 5 to the processing of singular-type recording events (e.g., one-time recording events).

Figure 1:
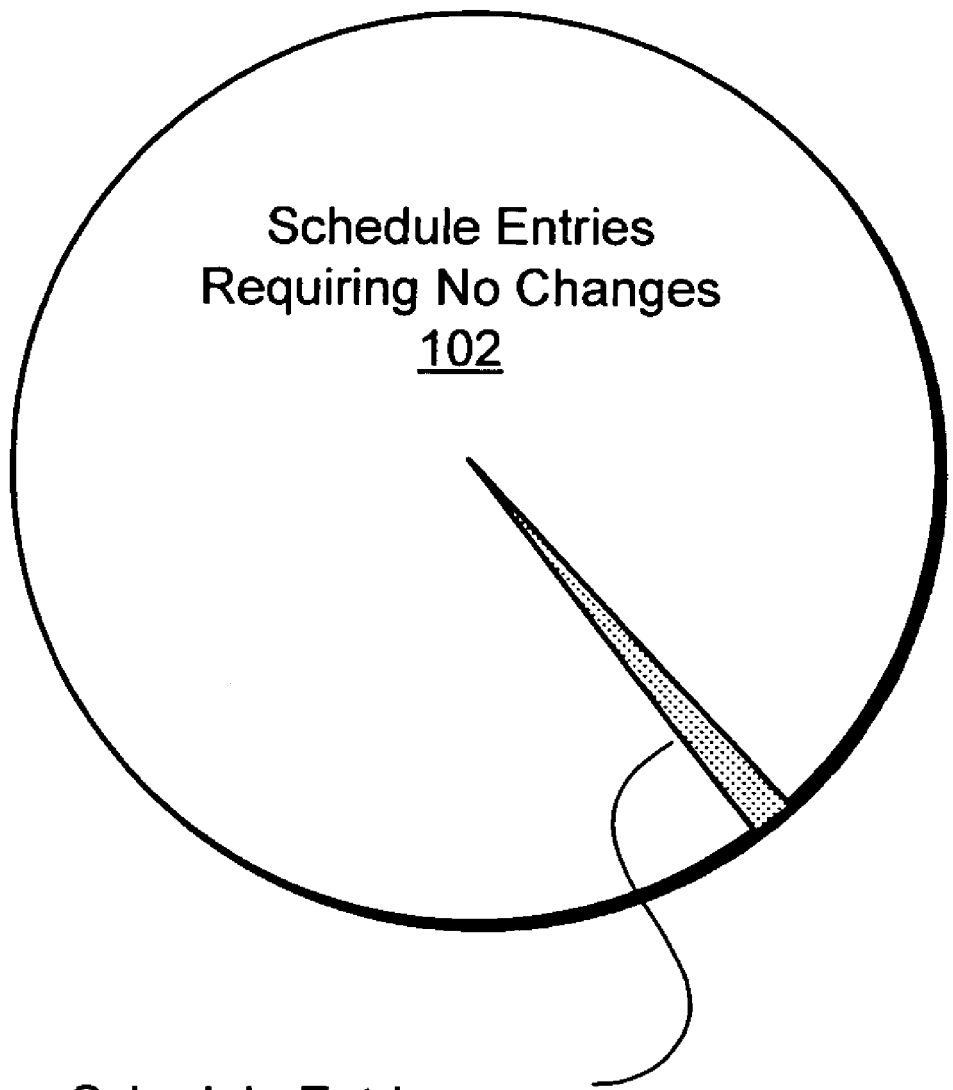
FIG. 1 shows the characteristics of a typical updating operation, illustrating a portion of a schedule that typically does not require updating in relation to a portion of the schedule that typically does require updating.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth scheduling functionality located at a head-end operations center for processing individual schedules associated with respective client devices. The allocation of scheduling functionality to a head-end operations center is beneficial because it enables the use of "thin" client devices. Thin client devices refer to processing units having minimal scheduling-related functionality. Such thin client devices are potentially less expensive (and potentially easier to maintain) compared to traditional client-side schedulers.

At the same time, moving the locus of scheduling functionality from the client devices to an operations center raises a number of challenges. For example, assume that each of N client devices performs M scheduling tasks associated with a scheduling operation. A direct transfer of scheduling functionality from the client devices to the operations center requires that the operations center perform N*M tasks. This large workload can easily overwhelm the processing resources of the operations center, resulting in poor performance (e.g., slow response time). Moreover, certain scheduling operation may be outright precluded due to lack of sufficient processing resources. For example, there may not be enough time in a day to update the schedules on a daily basis. It is always possible to increase the amount of processing resources in the operations center to meet these demands; however, this solution is not efficient and does not scale well.

The head-end scheduling functionality described herein addresses these challenges by forming a master list of unique entries culled from the plurality of schedules, and then determining whether any entries in the master list require updating. As will be described below with respect to FIG. 1, the great majority of the entries will require no updating. The scheduling functionality can process the remaining entries that require updating on a client-by-client basis, that is, by updating the individual schedules to reflect the assessed changes. This has the effect of "slicing" the scheduling operation in a different manner than the traditional model. In the traditional model, the scheduling operation partitioned the processing task by client first, and then by schedule entries; the present approach partitions the processing task by schedule entries first, and then by client. Through this provision, the scheduling functionality can eliminate a large amount of redundant processing (compared to the traditional case in which each client device separately handles updates to its schedule). This reduction of redundant processing makes it feasible to implement scheduling at a head-end operations center site.

Additional features and attendant benefits of the strategies will be set forth in this description.

As to terminology, the term "media information" refers to any data represented in electronic form that can be consumed by a user. The media information can include any information that conveys audio and/or video information, such as audio resources (e.g., music, spoken word subject matter, etc.), still picture resources (e.g., digital photographs, etc.), moving picture resources (e.g., audio-visual television programs, movies, etc.), and so on.

The term "client device" refers to any unit for processing and presenting media information. For example, the client device can comprise a set-top box module, a digital video recorder (DVR), a rewritable digital video disc (DVD-RW) device, a computer equipped with media processing functionality, and so forth, or some combination of such devices.

The term "media presentation event" refers to the presentation of media information, such as a television program, a piece of music, etc.

The term "entries" describes information presented in a schedule which describes media presentation events. A first type of schedule entry describes a singular-type presentation event having an occurrence which is fully resolved in an existing schedule. For example, a schedule entry that identifies a program X that airs on channel Y at time Z comprises a singular-type schedule entry. More specifically, this entry is "singular" in the sense that it targets a specific known airing of the program. However, this terminology does not imply that there is necessarily only one airing of the program. That is, there may be multiple airings of a same program; a singular-type schedule entry is said to be singular only in the sense that it targets one of these airings.

On the other hand, a second type of schedule entry identifies a series-type presentation event. This kind of entry refers to a general category of singular-type presentation events, some of which may yet to be determined. For example, a series-type schedule entry can generally identify a comedy series having episodes that occur on Sunday nights at 7:00 PM. This series-type entry acts as an instruction to identify new presentation events corresponding to newly discovered instances of this series. But once these new episodes are identified, they are added to the schedule as singular-type entries (since they are now fully resolved as specific events that occur at specific identified times).

Generally, the information presented in a schedule can be considered "schedule information."

The term "program guide" refers to master schedule information which defines the timing of media presentation events delivered by a plurality of different sources (e.g., channels). The term "program guide information" generally refers to information presented in a program guide. The program guide information may comprise electronic program guide (EPG) information that is updated on a periodic basis.

The term "master list" defines a collection of unique entries culled from a plurality of schedules.

This disclosure includes the following sections. Section A explains an exemplary system for implementing the schedule functionality. And section B presents flowcharts and accompanying examples that illustrate the operation of the system of Section A.

A. Exemplary System (FIGS. 1-4)

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code (and/or declarative-type instructions) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of the Exemplary Design Paradigm (FIG. 1)

Traditionally, when new program guide information is received, client-side scheduling functionality examines an existing schedule vis-à-vis the new program information to determine whether any changes need to be made to the existing schedule. For example, the new program guide information may indicate that one or more entries in the existing schedule are preempted, rescheduled, and so forth. Or the new program guide information may reveal the existence of a new episode for a series-type entry identified in the exiting schedule. These alterations require that changes be made to the schedule so that it is up-to-date with respect to current program guide information.

FIG. 1 shows a pie chart that represents the outcome of an exemplary average updating operation. The predominate portion 102 of the chart represents schedule entries for which no changes are needed. That is, for these entries, the new program guide information does not differ from previous program guide information, thus warranting no modification to the scheduled entries. The smaller portion 104 of the chart represents schedule entries that do require changes. That is, for these entries, the new program guide information does differ from previous program guide information, thus warranting modification to the scheduled entries. The percentages shown in the pie chart are merely exemplary; nevertheless, in a typical case, the predominate portion 102 will be much larger than the smaller portion 104. For example, the predominate portion may represent approximately 95% of the schedule entries in a typical schedule.

Another feature of scheduling operations is that there is typically an overlap between the entries of different schedules, such that, at any given time, plural schedules will include one or more of the same entries. For example, two schedules associated with two respective client devices may both include entries to record program X at time Y on channel Z. This will particularly be the case for the most popular programs.

As appreciated by the present inventors, the above findings imply that two or more conventional client devices will likely be performing, in part, the same processing tasks when updating their respective schedules. Moreover, the great majority of these scheduling operations will not result in any changes being made to the existing schedules. The present invention leverages these findings by: (a) changing the locus of schedule processing from the client devices to scheduling functionality deployed at an operations center; and (b) performing tasks that are common to plural schedules only once (rather than separately for each schedule).

To implement the above design, scheduling functionality is provided at a head-end operations center. The scheduling functionality formulates a master list of all unique entries in all of the schedules (created by users interacting with respective client devices). The scheduling functionality then performs a single analysis of the master list to determine those master list entries which do not require updating. The scheduling functionality need take no further action with respect to those entries. As such, the scheduling functionality can potentially remove a larger number of redundant actions. This is because, as stated above, each client device otherwise would need to separately analyze the entries in its schedule to come to conclusion of whether these entries are affected by the new program guide information.

With respect to the entries that have changed, the scheduling functionality can also reduce some redundant operations. For example, assume that the scheduling functionality determines that 10 schedules include an entry that has been preempted. This determination need only be made once for all 10 schedules based on an analysis of this entry in the master list. It remains only to separately update each of the 10 schedules to remove the preempted entry from each schedule.

A.2. Overview of the Exemplary System that Includes the Scheduling Functionality (FIG. 2)

Figure 2:
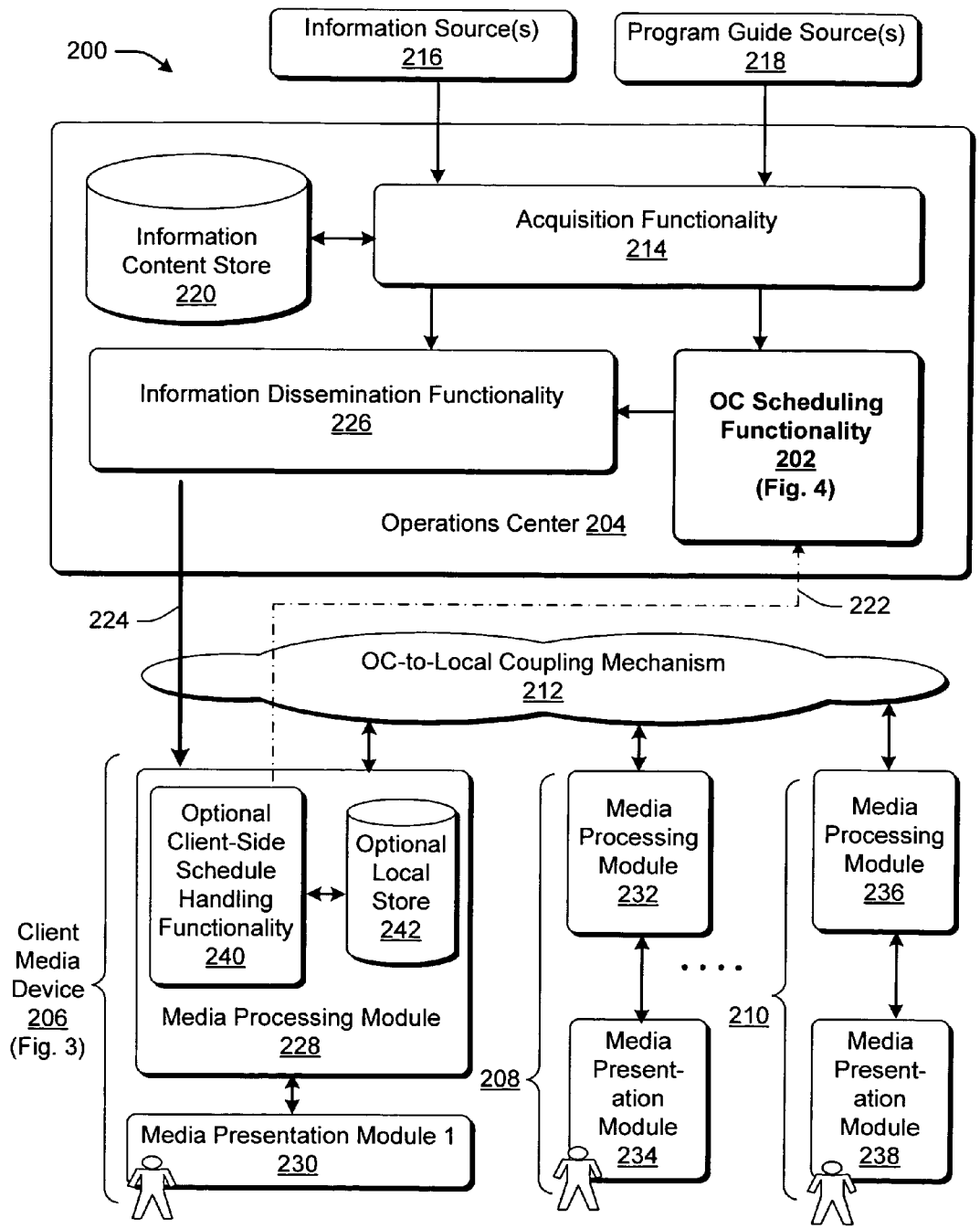
FIG. 2 shows an exemplary system for implementing scheduling functionality which leverages the concept shown in FIG. 1.

FIG. 2 shows one exemplary system 200 that can be used to implement the above-described scheduling functionality 202. In this specific example, the system 200 includes an operations center 204 for delivering digital streams of media information to a collection of client devices (206, 208, ... 210) via a coupling mechanism 212. However, the scheduling functionality 202 can also be employed in a wide variety of other types of systems, including systems which disseminate analog media information using traditional delivery infrastructure (e.g., using terrestrial antenna delivery mechanisms, satellite delivery mechanisms, cable delivery mechanisms, and so forth). For instance, the scheduling functionality 202 can be used in a media distribution system in which set-top boxes are coupled to the head-end functionality via conventional cable infrastructure. More generally, the scheduling functionality 202 can be employed in any system that permits two-way communication between the scheduling functionality 202 and the client devices (206, 208, ... 210), allowing users of the client devices (206, 208, ... 210) to communicate with the operations center 204 to create schedules, and, in response, allowing the operations center 204 to provide media information to the users based on the schedules.

In the exemplary implementation of FIG. 2, the operations center 204 includes acquisition functionality 214 for supplying the media information from one or more sources 216 of such information. The sources 216 can represent any kind of entity which produces or provides media information, such as cable or satellite television providers, one or more Video-On-Demand (VOD) providers, one or more publishing houses of information, one or more library sources, any kind of Internet-enabled repository, and so on. The media information received from these sources 216 can include video, audio, still pictures, and/or other multimedia content. In general, the sources 216 can supply live information or prerecorded information. Live information corresponds to information that captures a current state of an ongoing event (such as a sporting event which is being televised live). Prerecorded information corresponds to information that has already been recorded in its entirety.

The acquisition functionality 214 also receives program guide information from a program guide source 218. The program guide source 218 can represent any kind of entity which produces or provides program guide information, such as a commercial service which compiles and distributes electronic program guide (EPG) information. The program guide information typically identifies media events which will occur within an identified span of time, such as a 12 day span. The program guide information can identify events by providing ID information which represents the events, the times at which the events will begin and end, and sources (e.g., channels) which will present the events, and so forth. The program guide information can also include other characteristics regarding the events, such as the titles of the events, the actors and directors associated with the events, and so forth.

The acquisition functionality 214 itself can comprise one or more server computers or other functionality dedicated to the task of retrieving the resource information.

The operations center 204 optionally includes an information content store 220 for storing the media information prior to its dissemination to the client devices (206, 208, ... 210). The information content store 220 can be implemented as one or more databases and associated database management functionality.

The coupling mechanism 212 couples the operations center (OC) 204 to the client devices (206, 208, ... 210), and is therefore referred to as an OC-to-local coupling mechanism. This coupling mechanism 212 can be implemented in different ways to suit different technical and commercial environments. For instance, the coupling mechanism 212 can include any kind of network (or combination of networks), such as a wide area network (e.g., the Internet), an intranet, Digital Subscriber Line (DSL) network infrastructure, point-to-point coupling infrastructure, and so on. The coupling mechanism 212 can use or involve any kind of protocol or combination of protocols. In the case where one or more digital networks are used to disseminate information, the coupling mechanism 212 can include various hardwired and/or wireless links, routers, gateways, name servers, and so on. In the case where DSL infrastructure is used to disseminate information, the coupling mechanism 212 can utilize the services, in part, of telephone coupling infrastructure and DSL processing functionality.

The coupling mechanism 212 permits two-way communication between the operations center 204 and the client devices (206, 208, ... 210). For example, this two-way communication enables the client devices (206, 208, ... 210) to send schedule selections to the operations center 204 (via path 222), and enables the operations center 204 to send media information to the client devices (206, 208, ... 210) (via path 224). The channel connecting the operations center 204 to the client devices (206, 208, ... 210) can be implemented using the same communication mechanism as the channel connecting the client devices (206, 208, ... 210) to the operations center 204; alternatively, these channels can be implemented using different communication channels.

The operations center 204 can also include information dissemination functionality 226 for supplying media information to the client devices (206, 208, ... 210) via the coupling mechanism 212. Different systems may use the information dissemination functionality 226 in different ways. One exemplary system may use the information dissemination functionality 226 to transmit media information received from the acquisition functionality 216 (or from some other source) in unicast fashion. Another exemplary system may use the information dissemination functionality 226 to transmit media information in broadcast or multicast fashion (using, for example, the Internet Group Management Protocol (IGMP)). In another implementation, the information dissemination functionality 226 can deliver media information using a combination of unicast communication and multicast communication.

The information dissemination functionality 226 can be implemented as a collection of server modules (not shown) that facilitate the transmission of media information to the client devices (206, 208, . . . 210). The server modules may provide redundant services, such that any of the server modules can be assigned to provide the same service to any of the client devices (206, 208, . . . 210).

Whatever delivery strategy is used, the operations center 204 can deliver media information to the client devices (206, 208, . . . 210) using a variety of packaging paradigms. In one case, the operations center 204 can supply a sequence of programs to users in different channels. In this mode, the operations center 204 can present the programs according to a fixed schedule, in the manner of traditional delivery of channels (although the channels may not have the frequency-specific connotation of traditional analog systems which use physical tuners). In another case, the operations center 204 can supply individual programs to users at fixed times.

The media information itself can be expressed in any format, including, but not limited to, the MPEG-2 standard, Microsoft Corporation's VC-1 standard, the ISO/ITU H.264 standard, and so forth. The coded media information can be encapsulated into packets using any format, including, but not limited to, the Real Time Transport Protocol (RTP), the Real Time Streaming Protocol (RTSP), the Advanced Streaming Format (ASF), and so forth. The above-described above-nominal burst of media information is preferably configured to start at a key frame (e.g., in the MPEG-2 standard, an I frame, rather than a B or P frame). This better ensures that the client devices (206, 208, . . . 210) can quickly begin presenting the media information in an unproblematic manner (because, otherwise, these devices would need to wait for the occurrence of a key frame in the stream of media information).

Now referring to the client-side aspects of the system 200, the client devices (206, 208, . . . 210) themselves can be implemented in different ways. Any given client device (206, 208, . . . 210) may represent a television set with integral IP interfacing/processing functionality, a television set with an associated set-top box coupled thereto, a digital video recorder (DVR) device, a rewritable digital video disc (DVD-RW) device, a personal computer having AV decoding functionality, and so forth (as well as any combination of these devices). Or a given client device (206, 208, . . . 210) can take the form of a personal mobile telephone, personal digital assistant (PDA), tablet-type computer device, any kind of wearable computer (e.g., a wristwatch-type computer device), and so forth.

In whatever manner the client devices (206, 208, . . . 210) are implemented, they can comprise a media processing module that is communicatively coupled to a media presentation module. For instance, the client device 206 includes media processing module 228 coupled to media presentation module 230, the client device 208 includes media processing module 232 coupled to media presentation module 234, and the client device 210 includes media processing module 236 coupled to media presentation module 238. The media processing modules (228, 232, . . . 236) may comprise functionality for processing the media information, and the media presentation modules (230, 234, . . . 238) may comprise functionality for presenting the output of the media presentation modules (228, 232, . . . 236). The media processing modules (228, 232, . . . 236) can be integrated with the media presentation modules (230, 234, . . . 238) (e.g., in the case where the media processing modules are integrated into respective IP-ready television sets), or the media processing modules (228, 232, . . . 236) can be separate from (but coupled to) the media presentation modules (230, 234, . . . 238)) (e.g., in the case where the media processing modules are housed in respective set-top boxes that are coupled to television sets).

FIG. 2 also shows an overview of the exemplary composition of the representative client device 206. This device 206 includes the media processing module 228, which, in turn, can comprise optional client-side schedule handling functionality 240. If present, this functionality 204 performs whatever tasks are required to cooperate with the scheduling functionality 202 deployed at the operations center 240. Finally, the media processing device 206 may also include optional local storage 242. The local storage 242 can be used to store streams of media information and other information.

In one implementation, the system 200 can allocate all of the scheduling-related tasks to the scheduling functionality 202 deployed at the operations center 204. For example, the scheduling functionality 202 can include a mechanism for allowing users to create, review and revise schedules. The scheduling functionality 202 can also include a store (not shown) for storing the created schedules. The scheduling functionality 202 can also include a mechanism for updating schedules upon the receipt of new program guide information (or in response to some other event that affects the schedules). And finally, the scheduling functionality 202 can also include a mechanism for recording media information identified by the schedules at the operations center 204, and then interfacing with the users to access and play back such recorded media information. In this scenario, the client-side schedule handling functionality 240 can effectively be dispensed with, producing "thin" and (and thus relatively inexpensive) client devices (206, 208, . . . 210).

In another implementation, the system 200 can allocate some scheduling functions to client-side schedule handling functionality 240. For instance, the client-side schedule handling functionality 240 can include a client-side mechanism for allowing a user to create, review and revise a schedule, as well as a mechanism for retrieving media information that has been recorded in accordance with the schedule. The representative client device 206 can also optionally store its associated schedule in its local store 242 (rather than rely on the operations center 204 to store the schedule). In this design, the head-end scheduling functionality 202 can perform the updating analysis based on the master list, but it can defer to the client device 206 to perform the actual updating of schedules, e.g., by sending instructions to the client device 206 that allow it to perform this updating operation. Finally, representative client device 206 can also optionally locally store the media information that is recorded based on its schedule based on instructions from the operations center 204 (rather than rely on the operations center 204 to store the schedule).

In a variation of the above designs, the OC scheduling functionality 202 can store the schedules and can also execute the logic which determines which schedules need to be updated. The client device 206, however, can also store a local copy of its own associated schedule (e.g., in volatile cache memory). This allows the client device 206 to quickly access and display the schedule to the user when required. The OC scheduling functionality 202 can download an up-to-date version of the schedule when the client device 206 starts up. The OC scheduling functionality 202 can also download instructions which update the client device 206's schedule when it determines that the schedule needs to be updated (e.g., in response to the receipt of new program guide information which affects the schedule). In this implementation, the client device 206 can also locally record the media information based on the local version of its schedule.

As a further variant, the scheduling functionality (wherever deployed) need not allocate a separate scheduler to each distinct client device. Rather, a single scheduler (wherever deployed) can serve multiple client devices. For example, a single scheduler can serve multiple client devices that operate within a household.

Still further allocations of functionality between the head-end scheduling functionality 202 and the client-side schedule handling functionality 240 are possible. In any event, to reduce redundant processing, the preferred implementation uses the operations center 204's scheduling functionality 202 to at least form a master list of schedule entries and then to coordinate the updating of individual schedules based on the master list. Subsection A.4 (below) provides additional information regarding one exemplary implementation of the scheduling functionality 202.

A.3. Exemplary Client-End Details (FIG. 3)

Figure 3:
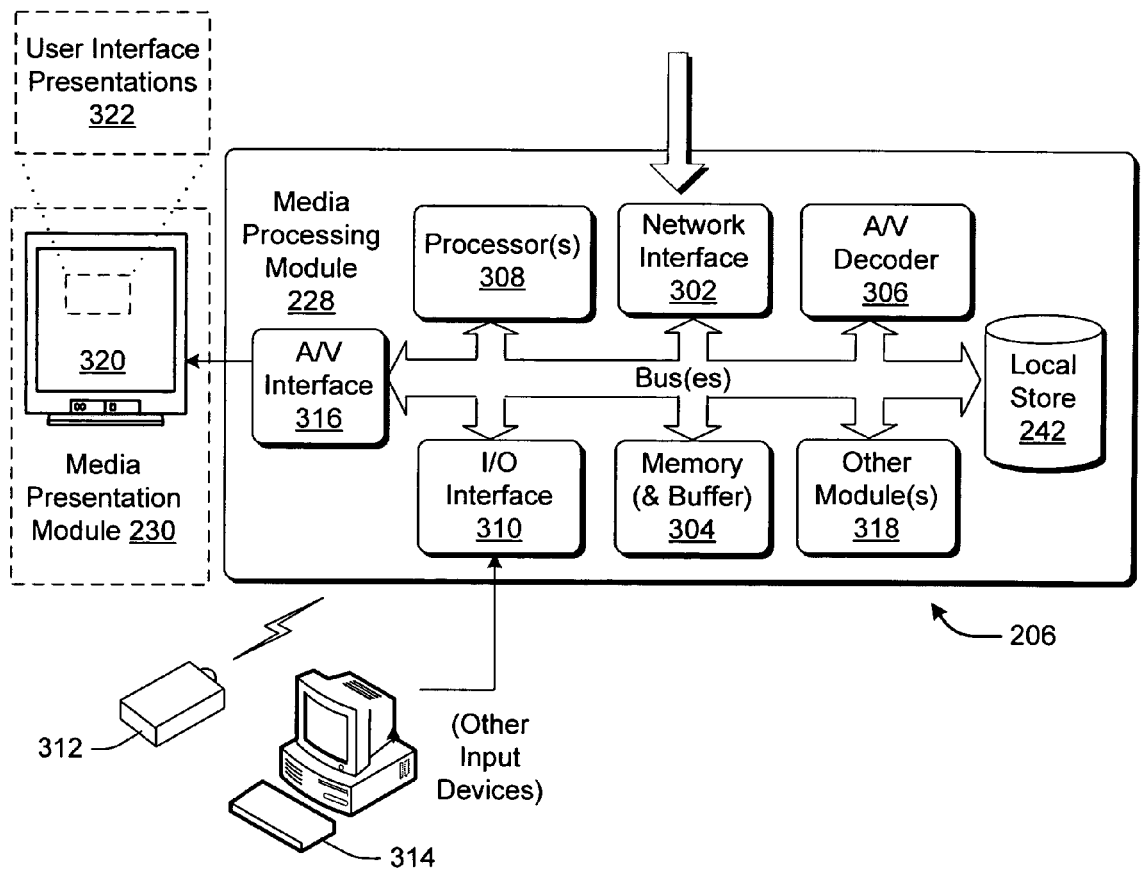
FIG. 3 shows an exemplary client device for use in the system of FIG. 2.

FIG. 3 provides additional details regarding the representative client device 206 (introduced in the context of FIG. 2). The composition of the client device 206 shown in FIG. 3 is merely representative of one possible exemplary implementation. For instance, while the example of FIG. 3 involves the reception and processing of a stream of digital information, other implementations of the client device 206 can employ technology to receive and process analog media information.

The client device 206 comprises the above-identified media processing module 228 coupled to the media presentation module 230. In one case, the media processing module 228 can comprise AV processing functionality combined with the media presentation module 230 in a single integrated device (e.g., a single IP-ready television set). In another case, the media processing module 228 can comprise a separate set-top box or DVR unit (or other kind of separate unit) that communicatively couples to the media presentation module 230 (e.g., a television screen).

The media processing module 228 can include a number of modules for performing its ascribed tasks. To begin with, the media processing module 228 includes a network interface module 302. The network interface module 302 can represent any functionality for receiving media information from the operations center 204 using any coupling mechanism. For example, the network interface module 302 can comprise an Ethernet NIC, a DSL modem, a cable modem, a wireless network interface, or other kind of network interface equipment.

The media processing module 228 also includes memory 304. A portion of the memory 304 can comprise a FIFO-type buffer for storing media information prior to the information being decoded.

The media processing module 228 also includes an audio-visual (AV) decoder 306 for decoding (and decompressing) the received media information into its video and audio components. Decoding comprises ordering packets (if received out of order), extracting media information from the stream of received packets, and also extracting timing information that will govern the playback of the media information.

The media processing module 228 also includes one or more processors 308 for executing instructions to implement the functionality of the media processing module 228.

The media processing module 228 also includes an I/O interface 310 for interacting with the consumer via one or more input devices (e.g., a remote controller 312, a PC 314, a joy stick (not shown), a touch screen input mechanism (not shown), and so forth).

The media processing module 228 also includes an A/V interface module 316 for providing media information in an appropriate format (e.g., in an appropriate color space) to the media presentation module 230.

The media processing module also includes the above-identified local store 242 for storing media information and/or other information. In general, any combination of storage devices (e.g., memory 304, local store 242, etc.) deployed by the client device 206 can be used to store instructions which implement the client-side schedule handling functionality 240 (if this optional client-side functionality is deployed).

Finally, the client processing module 228 can include various other modules 318, not specifically enumerated in the figure. For instance, the client processing module 228 can include a graphics compositor for combining a video component of the media information from the AV decoder 306 on a frame-by-frame basis with graphics information. The graphics information may comprise various user interface presentations which are overlaid on the media information.

The media presentation module 230 may comprise any kind of device for presenting AV information, including a CRT-type device, an LCD-type device, and so forth. In any case, the media presentation module 230 defines a display surface 320. The media processing module 228 can present one or more user interface presentations 322 on the display surface 320. For example, a user interface presentation (not shown) can be provided which allows the user to create, review and revise a schedule. This interface can be provided by the scheduling functionality 202 (of the operations center 204) or locally by the client-side schedule handling functionality 240 (or by a combination of such functionality).

A.4. Exemplary Scheduling Functionality Details (FIG. 4)

Figure 4:
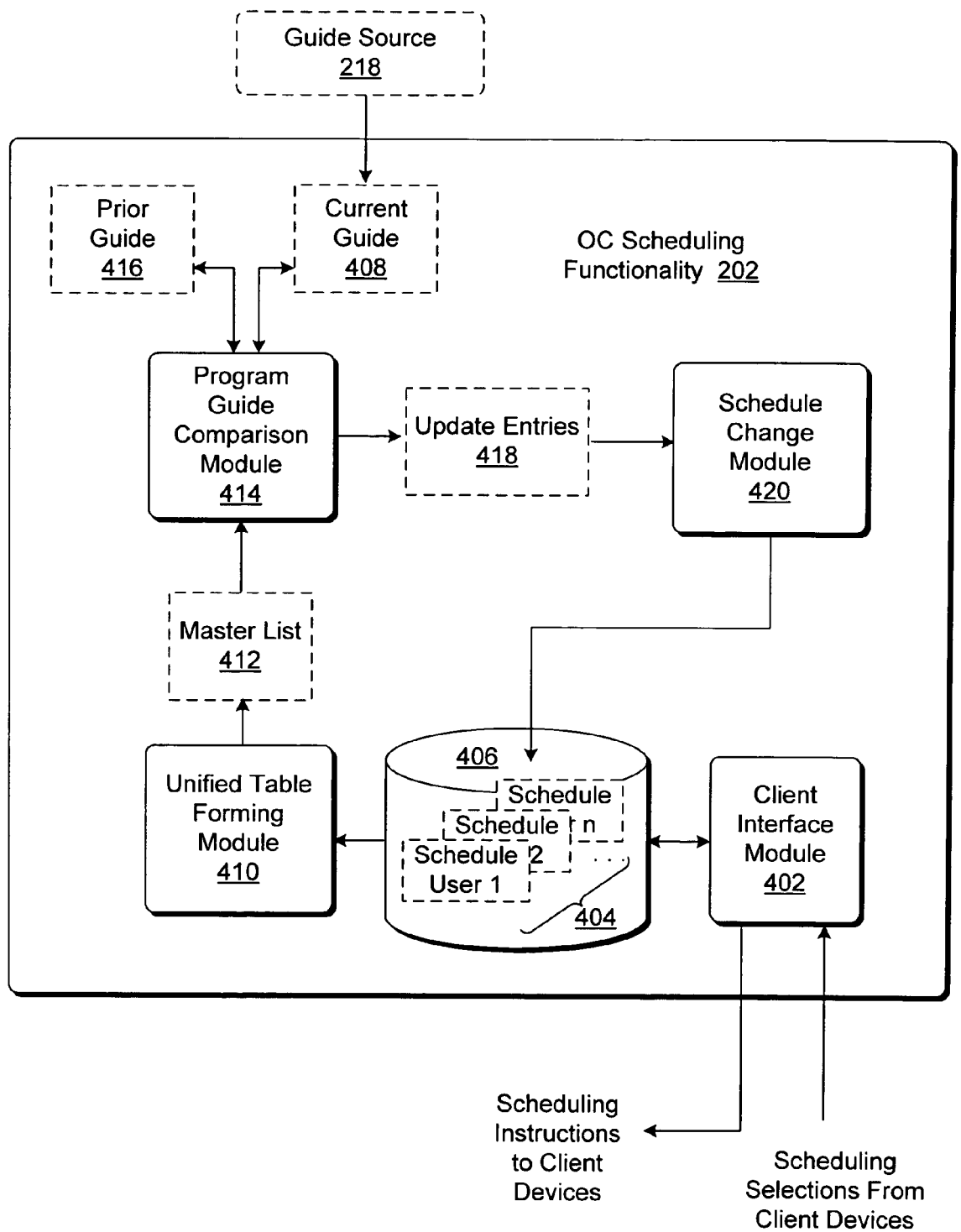
FIG. 4 shows a more detailed depiction of the scheduling functionality of the system of FIG. 2.

FIG. 4 shows exemplary details of the scheduling functionality 202. The components shown in FIG. 4 can be located together at a single head-end site or distributed over plural sites. For example, the scheduling functionality 202 can be implemented by providing multiple instances of its components (to be described below). For example, one set of instances can service a first collection of schedules, another set of instances can service a second collection of schedules, and so on. The different sets of instances can work independently, but can also cooperate with each other to provide an integrated scheduling service. Further, as previously stated, some of the operations can be allocated to the client devices (206, 208, ... 210). In general, the logic shown in FIG. 4 is exemplary; other functionality can use other logic to implement the basic design paradigm described herein.

To begin with, the scheduling functionality 202 includes a client interface module 402 for use in interfacing with the client devices (206, 208, ... 210). For example, the client interface module 402 can provide interface functionality which allow the users of the client devices (206, 208, ... 210) to create, review and revise schedules. In those implementations where the client devices (206, 208, ... 210) themselves record media information based on the schedules, the client interface module 402 can forward recordation instructions to the client devices (206, 208, ... 210) when prompted to do so by the respective schedules associated with the client devices (206, 208, ... 210). In contrast, in those implementations where the operations center 204 itself records the media information, the scheduling functionality 202 can coordinate the recordation of the media information in the operations center 204. In this case, the client interface module 402 can provide interface functionality which allows the users of the client devices (206, 208, ... 210) to select and play back these recordings stored at the operations center 202. (Alternatively, as discussed in prior subsections, some schedule-related interface functionality can also be locally implemented by the client devices.)

A plurality of schedules 404 created by the users can be stored in a schedule store 406. More specifically, the client devices (206, 208, . . . 210) (or some other mechanism) can create separate respective schedules 404 which govern the recording of media information (such as television programs) for playback at the client devices (206, 208, . . . 208). (Alternatively, the client devices (206, 208, . . . 210) can store their own respective schedules 404 in local stores, leaving the processing of these schedules to the head-end scheduling functionality 202.)

Each schedule can include one or more entries which describe associated media presentation events. For example, an entry may describe a media presentation event by identifying its start time, end time, source (e.g., channel it is airing on), and other salient characteristics of the media event. As described above, a first type of schedule entry identifies a one-time media presentation event; the purpose of such an entry is to record a singular-type presentation event that is fully resolved in the schedule. A second type of schedule entry identifies a series-type presentation event; the purpose of such an entry is to record all episodes that pertain to the identified series, including episodes that have yet to be determined. For example, a situation comedy may comprise a series having episodes that typically occur once per week, while a news program may comprise another series having "episodes" that occur once a day. Once a specific new instance described by a series-type entry has been identified in the program guide information, this instance constitutes a singular-type entry.

The scheduling functionality 202 updates the schedules 406 in response to various events. For example, the scheduling functionality 202 can trigger an update of the schedules 404 when new (current) program guide information 408 is received from the program guide source 218. This may happen at periodic intervals, such as one a day, twice a day, and so forth. In addition, the scheduling functionality 202 can trigger an update of the schedules 404 when some other event occurs that affects the schedules. For example, the operations center 204 may make a global change that affects all (or many) or the schedules 404, such as by adding or dropping a channel in a package that many users subscribe to. (For completeness of explanation, note that an end user can also individually make changes to his or her own schedule; however, these changes are of a different kind than guide-prompted updates, as the changes made by one user are generally not correlated with the changes made by other users.)

When the update process is triggered, a master list forming module 410 produces a master list 412. The master list 412 identifies all of the unique schedule entries in the schedules 404. For example, if schedule 1 includes entries A, G, N, T, while schedule 2 includes entries A, B, H, T, then the master list 412 will include entries A, B, G, H, T. In one implementation, the master list forming module 410 functions continuously in a background mode by examining all of the schedules 404 and compiling the master list 412. In this case, when the update process is triggered, the master list forming module 410 can immediately supply the master list 412. In another implementation, the master list forming module 410 can construct the master list 412 in an on-demand fashion when it receives an update request.

Next, a program guide comparison module 414 comes into play by determining whether any of the entries in the master list 412 need to be updated. It can perform this task by comparing the newly received program guide information 408 with previous program guide information 416 (if, in fact, the receipt of the new program guide information 408 was the event that triggered the update). For example, consider the case where the scheduling functionality 202 receives new program guide information 408 from the program guide source 218 on a daily basis. The current program guide information 408 can differ from the previous program information 416 in at least two respects. First, the current program guide information 408 can either preempt or reschedule one or more existing entries in the previous program guide information 416. Second, the current program guide information 408 can add new episodes pertaining to identified series-type events.

The program guide comparison module 414 operates by examining each entry in the master list 412, and determining whether the entry needs to be updated (due to the receipt of new information that affects this entry). As a result of this process, the program guide comparison module 414 identifies update entries 418. These entries 418 comprise a subset of entries in the master list 412 that require updating.

One way of simplifying the above task is to configure the program guide source 218 such that it only transmits difference information which reflects differences between the current program guide information 408 and the previous program guide information 416. In this case, the program guide comparison module 414 need only examine the current program guide information 408 to determine whether an entry in the master list 412 requires updating (since the current program guide information would contain nothing but new information).

The schedule change module 420 processes the update entries 418 by updating all of the schedules 404 affected by the update entries 418. In one exemplary implementation, the schedule change module 420 can identify, for each update entry, a list of schedules entries in the schedules 404 that are affected by the update entry. Then the schedule change module 420 makes changes to the schedules 404 on a schedule-by-schedule basis (and hence, a client-by-client basis). For example, assume that the program guide comparison module 414 indicates that a show "NYC-MDs" has been preempted. The schedule change module 420 can determine the subset of schedules 404 that include this entry. Then, the schedule change module 420 can systematically delete (or otherwise nullify) the show NYC-MDs in each of the identified schedules, processing each schedule in turn.

Further details regarding the operation of the scheduling functionality 202 of FIG. 4 are provided in the following section.

B. Exemplary Method of Operation (FIGS. 5-16)

The remaining figures describe the operation of the scheduling functionality 202 in flowchart form, in conjunction with specific examples which clarify the operation of the flowcharts. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the example set forth in this disclosure. As many functions described in these flowcharts have already been explained in prior sections, this section will serve primarily as a review of those functions.

B.1. Overview of the Method of Operation of the Scheduling Functionality (FIG. 5)

Figure 5:
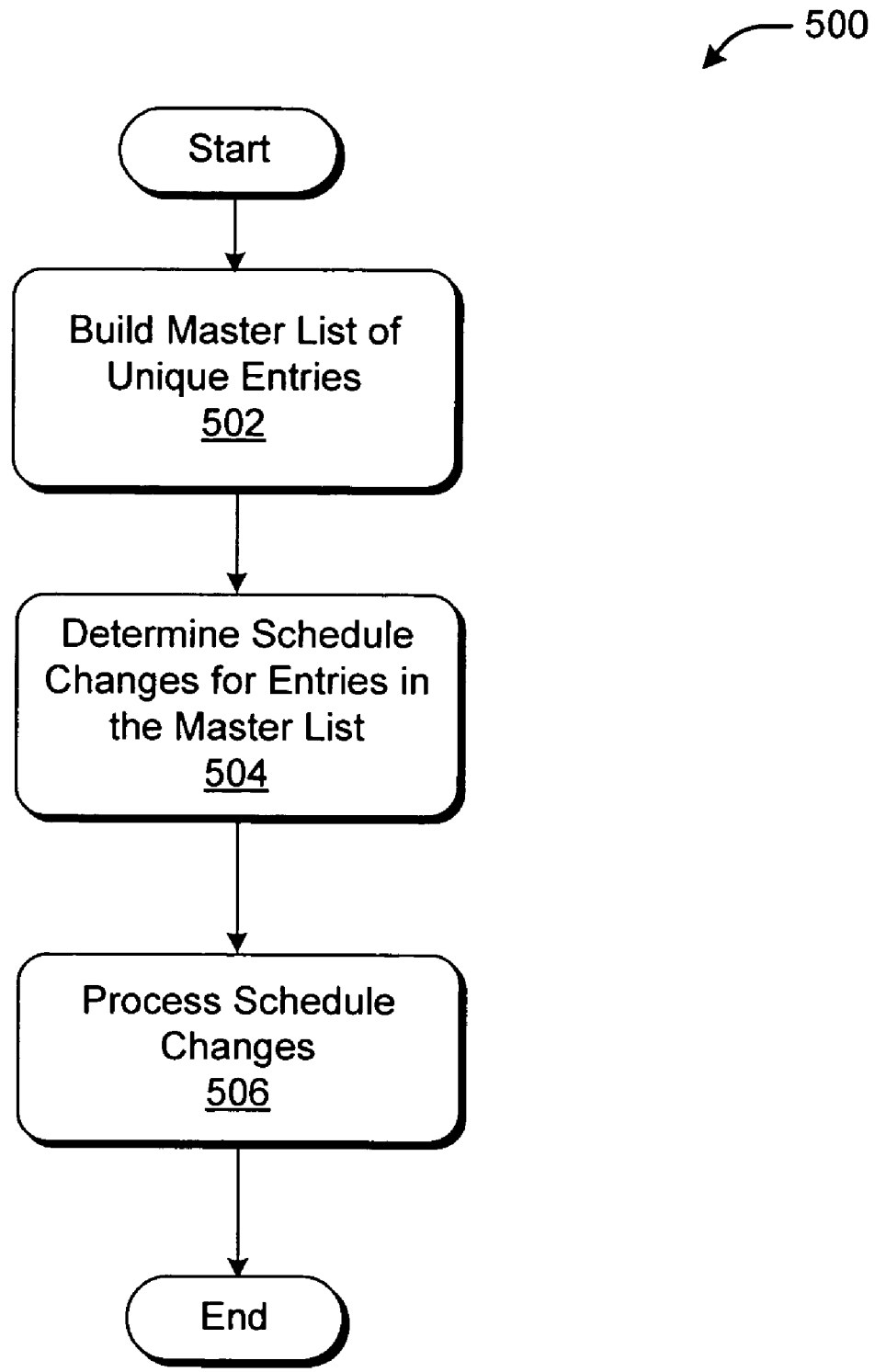
FIG. 5 shows a procedure which explains an exemplary manner of operation of the system of FIG. 2.

FIG. 5 shows a procedure 500 that sets forth an overview of the manner of operation of the scheduling functionality 202.

In step 502, the scheduling functionality 202 builds a master list 412 of unique entries that appear in the schedules 404.

If the scheduling functionality 202 cannot resolve whether two or more potentially redundant entries are identical, it can identify these entries as unique.

In step 504, the scheduling functionality 202 determines whether entries in the master list 412 require updating. As described above, the scheduling functionality 202 can perform this task by comparing the new program guide information 408 with the previous program guide information 416 with respect to each entry in the master list 412. Alternatively, in the case where the new program guide information 408 solely expresses new information, step 504 can determine whether the entries require updating simply by consulting the new program guide information 408.

In step 506, the scheduling functionality 202 updates the schedules 404 on the basis of the output of step 504. Step 506 can be implemented by making all changes that need to be made to a given schedule before advancing to another schedule. This provides an efficient approach because it reduces the number of times that the scheduling functionality 202 must locate and access each schedule that it is updating.

In summary, FIG. 5 corresponds to one exemplary implementation in which the scheduling functionality 202 determines a complete list of entries in the master list 412 that require updating (in step 504), and then proceeds to process this complete list (in step 506). However, alternative implementations are possible. For example, the scheduling functionality 202 can determine that an entry in the master list 412 requires processing and then immediately update all schedules affected by this entry before moving on to the next entry that requires updating in the master list 412.

B.2. Processing of Singular-Type Media Presentation Events (FIGS. 6-11)

The general procedure described above can be applied to at least two types of media presentation events that may be specified in the schedules 404. A first type of media presentation event comprises a singular-type media presentation event. An entry in a schedule identifies a singular-type event when it unambiguously identifies a single event (e.g., by specifying the episode ID of this event). To clarify the term "singular," a singular-type event need not identify a program that airs only once; rather, this event is said to be singular because it identifies a singular and well-defined airing of the program, where that airing may possibly be one of many airings of the program. In other words, a program X may have airing instances $X_1$, $X_2$ and $X_3$; a schedule which identifies instance $X_2$ is said to be a singular-type entry because it identifies the singular event of the occurrence of instance $X_2$. In contrast, a second type of media presentation event comprises a series-type media presentation event. An entry in a schedule identifies a series-type event for recording by identifying a series, but without specifically enumerating all of the episodes of the series (because the complete collection of episodes may be unresolved at any given time). Exemplary types of series-type presentation events include programs which occur once per week at a prescribed day and time, news and talk shows that occur once a day, and so forth. In the example above, a general instruction to record a series X would correspond to a series-type entry. But once new instances of series X are identified in new program guide information, these new instances are added to the schedule as singular-type entries (because they now identify specific instances, rather than the series X in general).

Figure 6:
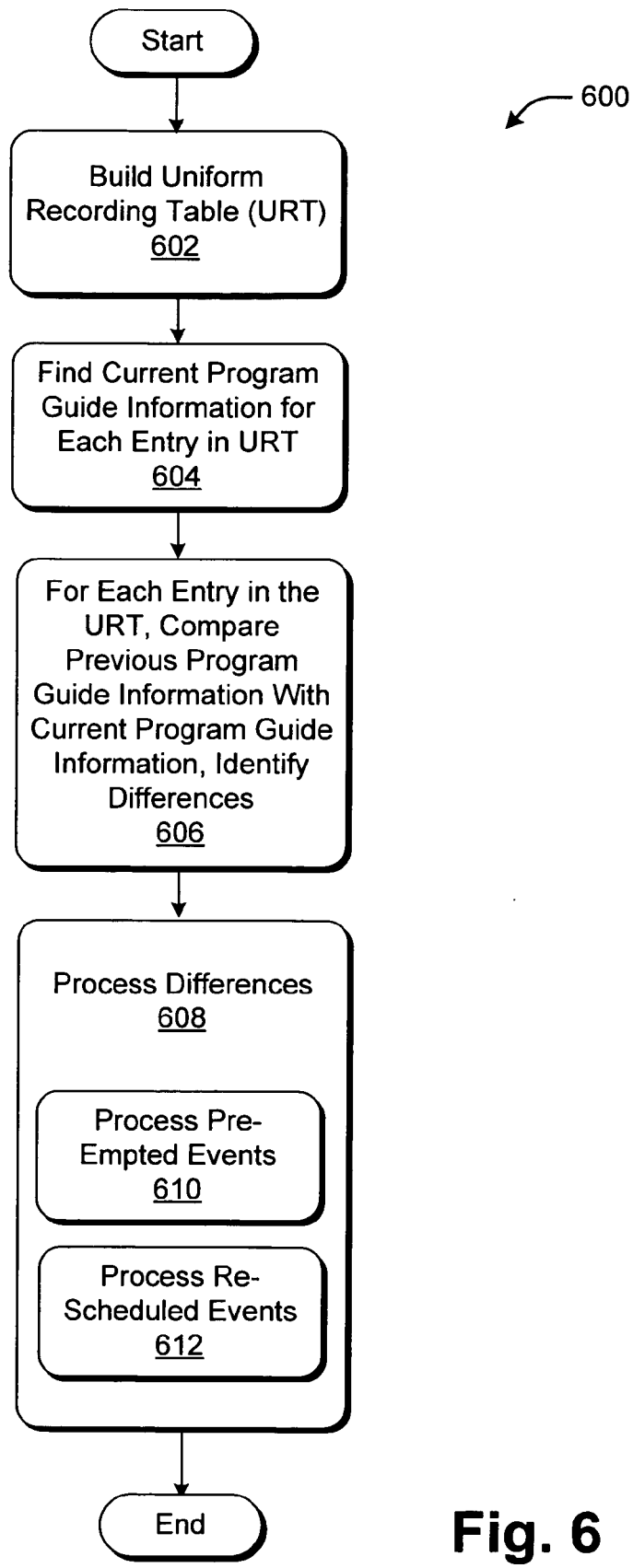
Figure 12:
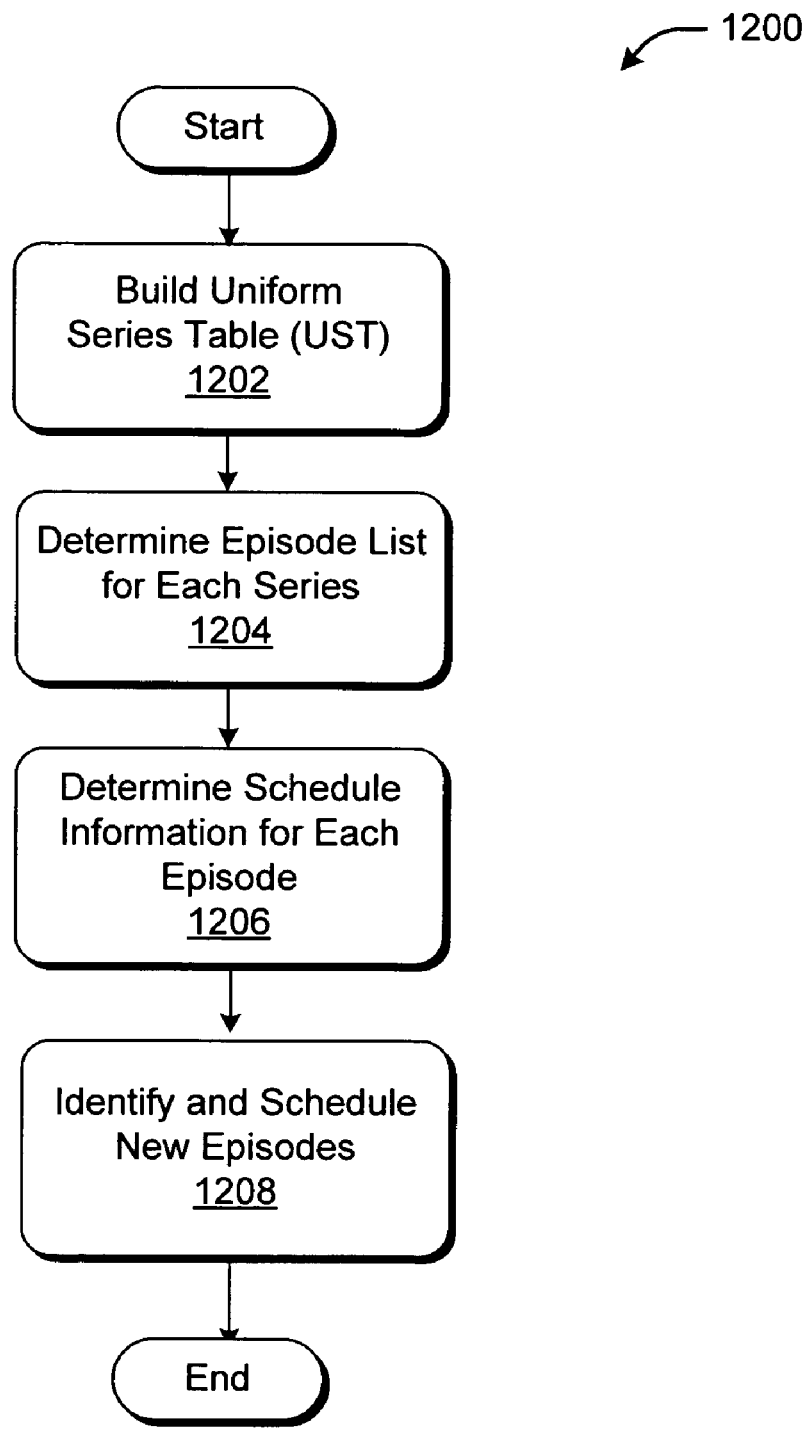
FIGS. 12-16 illustrate the application of the procedure of FIG. 5 to the processing of series-type recording events.

FIG. 6 describes the application of the principles described above to the processing of singular-type media presentation events, while FIG. 12 describes the application of these principles to series-type media presentation events.

Beginning with the procedure 600 shown in FIG. 6, in step 602, the scheduling functionality 202 builds a unified recording table (URT). This table is a particular instance of the master list 412 introduced in the context of FIG. 4. The URT table identifies all unique singular-type media presentation events contained in the schedules 404.

In step 604, the scheduling functionality 202 retrieves current program guide information 408 for each entry in the URT table. This can be performed by using the entries in the URT table as lookup keys to identify up-to-date programming data specified by the current program guide information 408.

In step 606, the scheduling functionality 202 determines, for each entry in the URT table, how the current program information 408 differs from the previous program information 416.

In step 608, the scheduling functionality 202 processes the differences identified in step 606. This processing entails updating the schedules 404 to reflect the differences assessed in step 606. More specifically, in the event that a difference reflects the fact that a previous schedule entry has been preempted (e.g., canceled), then step 610 entails updating all schedules that include this preempted entry (e.g., by removing specific instances of this preempted entry in the schedules 404, or otherwise nullifying these entries). In the event that a difference reflects the fact that a previous schedule entry has been rescheduled (e.g., moved to a new time slot, shortened, lengthened, etc.), then step 612 entails updating all schedules that include this rescheduled entry in an appropriate manner. More specifically, rescheduling a media presentation event can involve adjusting the beginning and ending time of that event, modifying the channel that will provide the event, and so forth, as well as addressing any potential conflicts caused by rescheduling the event (which can potentially involve adjusting the timing of other entries in a particular schedule).

Again, the procedure 600 shown in FIG. 6 is merely one exemplary way of implementing the general principles described herein. For instance, FIG. 6 corresponds to an exemplary implementation in which the scheduling functionality 202 determines a complete list of entries in the URT table that require updating (in step 606), and then proceeds to process this complete list (in step 608). However, alternative implementations are possible. For example, the scheduling functionality 202 can determine that an entry in the URT table requires processing, and then immediately update all schedules 404 affected by this entry before moving on to the next entry that requires updating in URT table.

FIGS. 7-11 present an example of the procedure 600 shown in FIG. 6. In this example, the system includes three client devices: client device 1; client device 2; and client device 3. (Although, in any commercial application, there may be thousands and perhaps millions of such client devices participating in a media distribution system).

FIG. 7 shows a table which represents an aggregation the schedules associated with the three client devices. Each row in the table represents a separate entry in the schedule. Some of the entries in the table may identify programs that occur only once and which have no series affiliation. Other of these entries may identify programs that constitute singular events within a series of events. The first column of this table identifies the client devices. Each client device has a schedule associated therewith. The second column identifies program IDs associated with the schedule entries. These program IDs provide short descriptors that identify the schedule entries. The third column identifies episode (EP) codes associated with the schedule entries. The fourth and fifth columns respectively identify the starting and ending times associated with the schedule entries. In other words, these times identify when the media presentation events associated with the schedule entries will begin and end. The sixth column identifies the sources (e.g., channels) that will provide the media information associated with the schedule entries. And the last column identifies the respective states of the schedules entries. Exemplary states include: defined (meaning that the schedule entry demarcates a media presentation event in a non-conflicted manner); conflicted (meaning that the schedule entry conflicts with one or more other schedule entries); and redundant (meaning that the schedule entry is duplicative of another schedule entry belonging to the same client— where that other entry has a "defined" state).

Step 604 (of FIG. 6) uses the raw data of FIG. 7 to produce the URT table shown in FIG. 8. In this case, although there is a total of nine schedule entries in the table of FIG. 7, there are only four unique programs in this group of nine entries. Therefore, the URT table of FIG. 8 contains only four URT entries (where items in the URT table are referred to as "URT entries" herein). Each URT entry in the URT table includes sufficient data to identify its associated media presentation event. In many cases, it is sufficient to provide just the episode data (EP) to uniquely identify a media presentation event. Where the EP data is unavailable, or where the EP data fails to unambiguously identify a media presentation event, then the URT table can provide supplemental information to identify the media presentation event. For instance, the URT table of FIG. 8 identifies the program entitled "Baseball" by providing its airing time and date, as well as the source (channel) which will provide this program.

Figure 9:
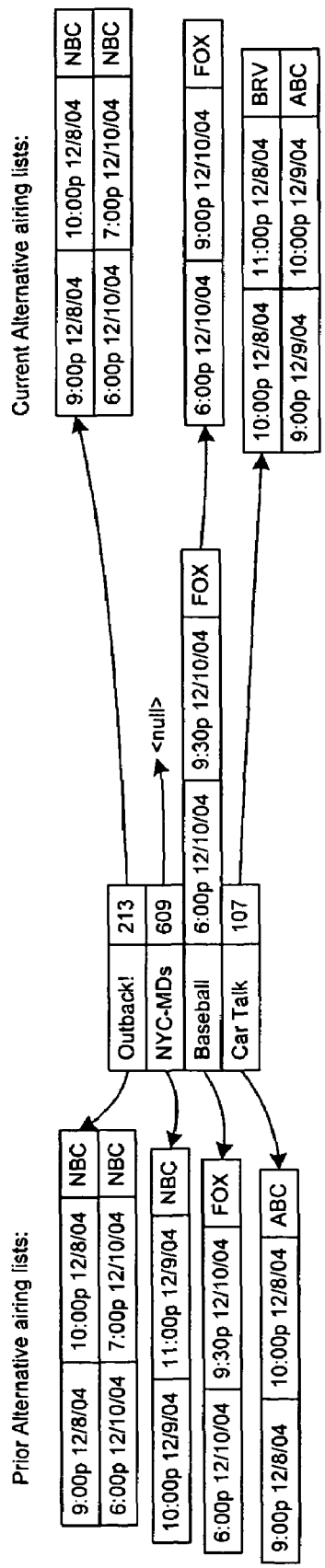

Step 606 (of FIG. 6) involves using the URT table of FIG. 8 as a key to determine whether each of the URT entries in the table needs to be updated. As previously explained, this operation can involve comparing the current program guide information 408 with previous program guide information 416, and noting any differences. FIG. 9 illustrates this procedure when applied to the URT table of FIG. 8. In this exemplary case, assume that the first schedule entry "Outback!" is unchanged (meaning that the current program guide information 408 identifies the same program data as the previous program guide information 416). However, assume that the second entry "NYC-MDs" has been pre-empted. Assume that the third entry "Baseball" has been time-shifted; namely, this entry has been shortened to end at 9:00 PM rather than its original-specified completion time of 9:30 PM. Assume that the last entry "Car Talk" has been rescheduled; previously, it was scheduled to air at 9:00 PM on Dec. 8, 2004 on the ABC channel, but it currently scheduled to air either at 9:00 PM on Dec. 9, 2004 on the ABC channel or at 10:00 PM on Dec. 8, 2004 on the BRV channel. The ABC and BRV channels therefore represent alternative airings of the same program "Car Talk."

Another way of implementing a comparison of previous program guide information with new program guide information is to assume that the information presented in FIG. 7 is representative of the previous program guide information (because, in fact, that information is compiled using the previous program guide information). It is true that the information in FIG. 7 does not represent the entire previous program guide information, but it contains all the information that is needed to determine whether the entries in the URT table need to be updated (when compared with the new program information).

One of the merits of the approach represented by FIG. 6 is that entries in the URT table that have not changed do not have to be processed at all beyond this point. For example, the schedule entry for "Outback!" has not changed. Therefore, the schedule functionality 202 need not perform any further processing for this entry in any of the schedules in which it appears (namely, clients 1 and 2). This strategy helps reduce redundant processing (compared to the case in which client devices are tasked with the responsibility of updating their own schedules on a local level).

Step 608 (of FIG. 6) involves processing the schedule entries that have changed. FIG. 10 represents the outcome of processing performed with respect to schedule entries that have been preempted. Since the schedule entry "NYC-MDs" has been pre-empted, FIG. 10 illustrates that this entry has been removed from schedules 2 and 3 (in which this entry originally appeared). This action therefore requires targeted processing performed with respect to schedules 2 and 3.

FIG. 11 represents the outcome of processing performed with respect to schedule entries that have been rescheduled. This causes a number of changes in the schedules. The first two entries for "Outback!" have not changed, other than that the state of the first entry has changed from "conflicted" to "defined" and the state of the second entry has changed from "conflicted" to "redundant." The "conflicted" state has been removed from these entries because of other changes have been made to the schedules that remove previously assessed conflicts with these entries. The third schedule entry for "Car Talk" has been changed from the original ABC airing to the alternative BRV airing. The fourth schedule entry of "Baseball" has been changed to account for the fact that this event has been shortened. And the last entry for "Car Talk" (with respect to schedule 3) has been changed to reflect its new airing is on Dec. 9, 2004 instead of Dec. 8, 2004.

B.3. Processing of Series Media Presentation Events

FIG. 12 describes a procedure 1200 which applies the principles described above to the processing of series-type media presentation events. In step 1202, the scheduling functionality 202 constructs a unified series table (UST). The UST table is analogous to the URT table. In this case, however, the UST table identifies the unique series-type entries in the schedules 404. For instance, a user may have created a schedule which includes a series-type entry that identifies a program "Mystery" which occurs every Sunday night. The inclusion of this series-type entry in the schedule acts as an instruction to record this program every Sunday night, even though all future episodes of this series may be undetermined at any given time.

In step 1204, the scheduling functionality 202 identifies an episode list for each of the entries in the UST table. More specifically, for a given series entry, the episode list identifies episodes that appear in the new program guide information 408 for this series entry.

In step 1206, the scheduling functionality 202 determines schedule information pertaining to each episode in each episode list. More specifically, for a given episode list, step 1206 accesses the current program guide information 408 to determine when the episodes identified therein will air (and on what channels the episodes will air).

In step 1208, based on the result of step 1206, the scheduling functionality 202 identifies and schedules new episodes (where new episodes correspond to episodes that have not been previously identified in a previous program guide). More specifically, consider a first case in which the current program guide information reveals that no episodes pertain to an identified series. If this is the case, the scheduling functionality 202 need not take any action with respect to this series for any of the client devices. Consider next a second case in which the current program guide information 408 does reveal the presence of one or more episodes pertaining to an identified series. In this case, the scheduling functionality 202 determines whether there are any new episodes in the identified episodes. If not, the scheduling functionality 202 does not need to take any action with respect to these entries (because these entries are pre-existing, and therefore accounted for by the protocol set forth in the preceding section). If, however, the episodes are determined to be new episodes, then the scheduling functionality 202 updates all of the schedules that have registered to record this particular series. Such scheduling operation can involve addressing any conflicts that may arise upon adding new entries to the schedules. Scheduling the new episodes can potentially involve additional analysis. For example, the scheduling functionality 202 can determine whether newly discovered episodes match various criteria defined by the user. For example, the user might only want to record episodes that occur on a particular channel; if a new episode is discovered on a different channel than specified by the user's perferences, it does not constitute a match.

Figures 13, 14, 15:
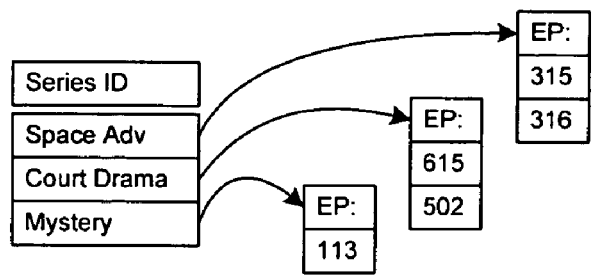

FIGS. 13-16 present an example of the procedure 1200 shown in FIG. 12. This example again sets forth the simplified case in which there are only three client devices having three respective schedules. FIG. 13 shows a table that identifies the series-type events that each of the client devices has registered to watch. Each row in the table represents a separate series-type entry in the schedule. The first column of this table identifies the client devices. The second column of the table identifies series IDs assigned to the series-type events. The third column of the table identifies the times at which the users wish to target episodes of the series. For example, if a user identifies "around 9 pm" as a matching criterion, then the search functionality 202 can be configured to look for new episodes that occur between 7 PM and 11 PM (in one exemplary case). The last column identifies the channels from which the users wish to receive new episodes of the identified series. If a user identifies "any" as a matching criterion, then the search functionality 202 can be configured to examine any available channel for new episodes.

Step 1202 (of FIG. 12) involves building the unified series table (UST) based on the data in the table of FIG. 13. The outcome of this processing is the UST table shown in FIG. 14. As indicated there, the UST table includes three entries because there are three unique series-type entries in the table of FIG. 13.

Step 1204 (of FIG. 12) involves enumerating the episodes associated with the entries in the UST table, based on data extracted from the current program guide information 408. The result of this processing is the information shown in FIG. 15. As indicated there, the first series entry, "Space Adv," includes two episodes associated therewith (episodes 315 and 316), the second series entry, "Court Drama," includes two episodes associated therewith (episodes 615 and 502), and the third series entry, "Mystery," includes one episode associated therewith (episode 113).

Step 1206 (of FIG. 12) involves accessing the current program guide information 408 and identifying schedule information pertaining to each of the episodes enumerated in FIG. 15. The result of this operation is the information shown in FIG. 16. As indicated there, some of the episodes air only once. Other episodes air in multiple time slots and/or potentially on multiple channels.

Figure 16:
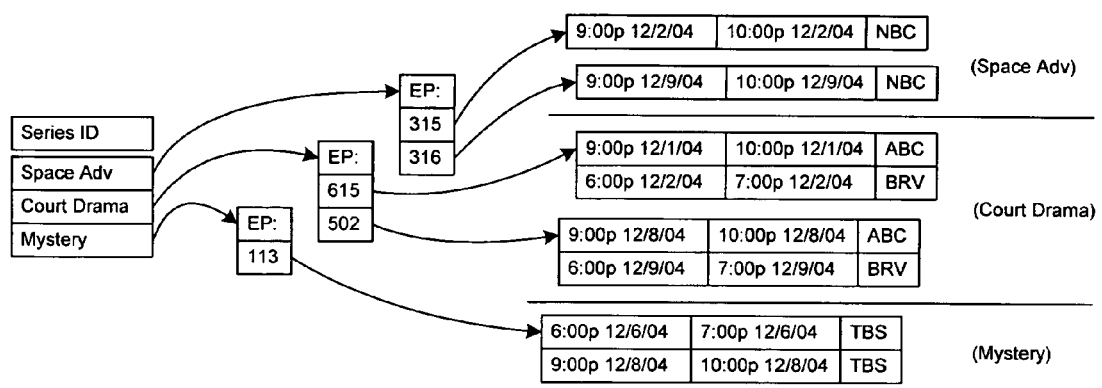

The final step of the procedure is to determine which ones of the episodes identified in FIG. 16 are new, and then to add any new episodes to the appropriate schedules. The scheduling functionality 202 performs this task by updating the schedules which have registered to receive series having new episodes. This procedure can involve resolving any conflicts that may occur in a known manner.

B.4. Other Exemplary Applications and Variations

The above examples pertain to the case in which users expressly identify programs, either by fully specifying singular instances of the programs or by specifying series that may encompass multiple program episodes. In addition, the principles underlying these examples can be extended to other scheduling-related applications. For example, the principles can be extended to applications which provide more flexible techniques for specifying new programs to be recorded. As before, once these new programs are identified, they constitute singular instances which are processed according to the technique defined in FIG. 6.

In one such application, the scheduling functionality 202 can permit users to specify programs by search terms (including keywords, key phrases, and various combinations of keywords, such as Boolean combinations of keywords, etc.). To reduce the amount of redundant operations required, the scheduling functionality can form an aggregate list (table) of searches registered by different users using different respective client devices. Optionally, this table can also break compound searches into their component elements. For example, the table may break a search that reads "Search: Clint Eastwood and 1980s" into "Search: Clint Eastwood" and "Search: 1980s." (Further, the scheduling functionality 202 can employ search logic which automatically expands search terms into related variants. For example, the search logic could expand "Clint Eastwood" to "Clint," "Eastwood," "Dirty Harry," and so forth.

Then, the search functionality 202 can execute each entry in the search table against the data in the current program guide information 408. If the search does not result in the retrieval of any hits, then the process is effectively finished for this search entry. However, if the search does identify a new matching entry, then the scheduling functionality 202 can update any schedules that may have registered this search. That is, the schedules are updated by adding singular-type entries to the schedules. Prior to actual recording, these singular-type entries are periodically processed using the technique described in FIG. 6.

The fact that a single search is being performed for several schedules allows the scheduling functionality 202 to reduce the amount of redundant work it must perform (compared to the case where each client device independently executes such a search). However, because there is much more variability in the way a user can identify programs using key words (compared to expressly identifying the program by episode ID or series ID), then this implementation may provide less dramatic reductions in processing operations (compared to the examples set forth in prior subsections). To address this variability, one solution is to constrain the users' options when entering search terms, such as by requiring the users to select from a predefined table of acceptable search terms.

Again, still additional applications of the principles described above are possible. For example, the examples set forth above pertain to the scheduling of audio-visual media information resources, such as television programs. But the principles can be applied to the scheduling of any media information, such as songs, and so forth.

In closing, a number of features were described herein by first identifying exemplary problems that these features can address. This manner of explication does not constitute an admission that others have appreciated and/or articulated the problems in the manner specified herein. Appreciation and articulation of the problems present in the relevant arts is to be understood as part of the present invention.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    coupling an operations center for communication with a plurality of client devices;
    maintaining recording schedule information at the operations center for a plurality of recording schedules corresponding to the plurality of client devices, each said recording schedule including one or more entries for recording identified media information for playback at the respective client device;
    compiling a master list of unique entries culled from the plurality of recording schedules;
    obtaining current program guide information pertaining to the entries in the master list of unique entries culled from the plurality of recording schedules for recording identified media information for playback at the respective client device;
    examining each of the entries in the master list of unique entries culled from the plurality of recording schedules in comparison with corresponding media presentations listed in the current program guide information;
    determining any differences between the current program guide information and the recording schedule information for the entries in the master list of unique entries culled from the plurality of recording schedules;
    updating at the operations center, based on the determining, a plurality of the recording schedules determined to include one or more entries requiring updating due to the differences between the entries in the master list and the current program guide information; and
    downloading to the respective client device each updated recording schedule for recording identified media information for playback at the respective client device.

2. The method of claim 1, wherein a plurality of the recording schedules include series-type entries for recording one or more program series, further comprising:
    constructing a unified series table that identifies unique series-type entries in the plurality of recording schedules;
    identifying an episode list for each series-type entry in the unified series table by examining the current program guide information;
    for a given episode list, accessing the current program guide information for determining a time when series episodes will be broadcast;
    identify new series episodes contained in the current program guide information and not contained in previous program guide information; and
    adding the identified new series episodes to the recording schedules of the client devices that have registered to record a corresponding series.

3. The method of claim 1, wherein the operations center further includes a mechanism for recording the media information identified in the recording schedules and interfacing with the client devices to access and play back the recorded media information.

4. The method of claim 1, wherein the compiling of the master list further comprises:
    aggregating the plurality of recording schedules associated with the plurality of client devices to compile an aggregation of entries;
    eliminating redundant and conflicted entries to compile the master list of unique entries culled from the plurality of recording schedules.

5. The method of claim 1, wherein the current program guide information is program guide difference information received from a program guide source, said program guide difference information reflecting only differences between current program guide information and previous program guide information.

6. The method of claim 1, wherein the differences are caused by one or more of:
    a preemption event in which a media presentation corresponding to at least one entry has been pre-empted;
    a reschedule event in which a media presentation corresponding to at least one entry has been rescheduled; and
    a new entry event in which at least one media presentation episode pertaining to an identified series newly appears in the current program guide information to be added to one or more of the plurality of recording schedules as a new entry.

7. The method of claim 1, wherein the updating comprises:
    identifying, for an entry in the master list that is determined to require updating, a subset of recording schedules of the plurality of recording schedules that require updating; and
    updating the entry in the identified subset of recording schedules on a schedule-by-schedule basis at the operations center.

8. The method of claim 1, wherein the compiling of the master list further comprises:
    compiling an aggregate list of search entries registered by a plurality of different respective client devices, wherein each search entry in the list describes at least one search term used by the plurality of different client devices to search for presentation entries that match said at least one search term;
    executing each search entry in the aggregate list against the current program guide information so that a single search is performed for a plurality of search entries from a plurality of respective client devices;
    identifying at least one new entry in the program guide information that matches at least one search entry; and
    updating the recording schedules of the plurality of client devices that registered the search entry by adding the identified new entry to the recording schedules of each of the client devices that registered the search entry.

9. The method of claim 8, wherein user options for entering the search terms are constrained by requiring users of the client devices to select from predefined acceptable search terms.

10. One or more computer-readable media containing computer-readable instructions for implementing the method of claim 1.

11. A system comprising:
    an operations center in communication with a plurality of client devices;
    a store at the operations center configured to store recording schedule information for a plurality of recording schedules corresponding to the plurality of client devices, wherein each recording schedule includes one or more entries for recording media information for playback at the respective client device;
    a master list forming module configured to compile a master list of unique entries culled from the plurality of recording schedules;
    a program guide comparison module configured to obtain current program guide information pertaining to the entries in the master list, examine each of the entries in the master list of unique entries culled from the plurality of recording schedules in comparison with corresponding media presentations listed in the current program guide information, and determine any differences between the current program guide information and the recording schedule information for the entries in the master list;

a schedule change module configured to update, at the operations center, based on an output result generated by the program guide comparison module, a plurality of the recording schedules determined to include one or more entries requiring updating due to the differences between the entries in the master list and the current program guide information; and a scheduling functionality at the operations center configured to download each updated recording schedule to the respective client device for recording identified media information for playback at the respective client device.

12. The system according to claim 11,
wherein a plurality of the recording schedules include series-type entries for recording one or more program series;
wherein the program guide comparison module is further configured to:
construct a unified series table that identifies unique series-type entries in the plurality of recording schedules;
identify an episode list for each series-type entry in the unified series table by examining the current program guide information;
for a given episode list, access the current program guide information for determining a time when series episodes will be broadcast;
identify new series episodes contained in the current program guide information and not contained in previous program guide information; and
add the identified new series episodes to the recording schedules of the client devices that have registered to record a corresponding series.

13. The system according to claim 11, wherein the operations center further includes a mechanism for recording the media information identified in the recording schedules and interfacing with the client devices to access and play back the recorded media information.

14. The system according to claim 11, wherein the master list forming module is configured to compile a master list by aggregating the plurality of recording schedules associated with the plurality of client devices to compile an aggregation of entries, and eliminate redundant and conflicted entries to compile the master list of unique entries culled from the plurality of recording schedules.

15. The system according to claim 11, wherein the current program guide information is program guide difference information received from a program guide source, said program guide difference information reflecting only differences between the current program guide information and previous program guide information.

16. The system according to claim 11, wherein the schedule change module is configured to update said at least one of the plurality of recording schedules by:
identifying, for an entry in the master list that is determined to require updating, a subset of recording schedules of the plurality of recording schedules that require updating; and
updating the entry in the identified subset of recording schedules on a schedule-by-schedule basis at the operations centers.

17. The system according to claim 11, wherein the master list forming module is configured to compile the master list by further compiling an aggregate list of search entries registered by a plurality of different respective client devices, wherein each search entry in the list describes at least one search term used by the plurality of different client devices to search for presentation entries that match said at least one search term, executing each search entry in the aggregate list against the current program guide information so that a single search is performed for a plurality of search entries from a plurality of respective client devices, identifying at least one new entry in the program guide information that matches at least one search entry, and updating the recording schedules of the plurality of client devices that registered the search entry by adding the identified new entry to the recording schedules of each of the client devices that registered the search entry.

18. The system according to claim 17, wherein user options for entering the search terms are constrained by requiring users of the client devices to select from predefined acceptable search terms.

19. The system according to claim 18, wherein the client devices are set-top boxes coupled to a head end functionality at the operations center via a cable television infrastructure.

20. A scheduling system, comprising:
a plurality of client devices, each said client device configured to create a recording schedule including one or more entries for determining a timing at which identified media information is to be recorded for playback at the respective client device that is used to create the recording schedule;
an operations center in communication with the plurality of client devices, said operations center including a scheduling functionality, comprising:
a store configured to store recording schedule information for each of the plurality of recording schedules created by each of the respective client devices;
a master list forming module configured to compile a master list of unique entries culled from the plurality of recording schedules;
a program guide comparison module configured to determine whether any entries in the master list require updating by determining current program guide information pertaining to the entries in the master list, examining each of the entries in the master list in comparison with corresponding media presentations listed in the current program guide information, and determining any differences between the current program guide information and the recording schedule information for the entries in the master list;
a schedule change module configured to update, based on an output result generated by the program guide comparison module, a plurality of the recording schedules by identifying, for an entry in the master list that is determined to require updating due to the differences between the entries in the master list and the current program guide information, a subset of recording schedules of the plurality of recording schedules that require updating, and updating the entry in the identified subset of recording schedules on a schedule-by-schedule basis at the operations center;
wherein the master list forming module is configured to compile the master list by further compiling an aggregate list of search entries registered by a plurality of different respective client devices, wherein each search entry in the list describes at least one search term used by the plurality of different client devices to search for presentation entries that match said at least one search term, executing each search entry in the aggregate list against the current program guide information so that a single search is performed for a plurality of search entries from a plurality of respective client devices, identifying at least one new entry in the program guide information that matches at least one search entry, and updating the recording schedules of the plurality of client devices that registered the search entry by adding the identified new entry to the recording schedules of each of the client devices that registered the search entry; and a scheduling functionality at the operations center configured to download each updated recording schedule to the respective client device.

* * * * *